US008314784B2

(12) United States Patent
Ohkami et al.

(10) Patent No.: US 8,314,784 B2
(45) Date of Patent: Nov. 20, 2012

(54) METHODS FOR DRIVING ELECTRO-OPTIC DISPLAYS

(75) Inventors: Takahide Ohkami, Newton, MA (US); Holly G. Gates, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 711 days.

(21) Appl. No.: 12/422,344

(22) Filed: Apr. 13, 2009

(65) Prior Publication Data

US 2009/0256799 A1 Oct. 15, 2009

Related U.S. Application Data

(60) Provisional application No. 61/044,067, filed on Apr. 11, 2008.

(51) Int. Cl.
*G06F 3/038* (2006.01)

(52) U.S. Cl. ........................................ 345/204; 345/107

(58) Field of Classification Search ........................ None
See application file for complete search history.

(56) References Cited

U.S. PATENT DOCUMENTS

| | | | |
|---|---|---|---|
| 3,668,106 | A | 6/1972 | Ota |
| 3,756,693 | A | 9/1973 | Ota |
| 3,767,392 | A | 10/1973 | Ota |
| 3,792,308 | A | 2/1974 | Ota |
| 3,870,517 | A | 3/1975 | Ota et al. |
| 3,892,568 | A | 7/1975 | Ota |
| 4,418,346 | A | 11/1983 | Batchelder |
| 5,745,094 | A | 4/1998 | Gordon, II et al. |
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II et al. |
| 5,930,026 | A | 7/1999 | Jacobson et al. |
| 5,961,804 | A | 10/1999 | Jacobson et al. |
| 6,017,584 | A | 1/2000 | Albert et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,097,531 | A | 8/2000 | Sheridon |
| 6,118,426 | A | 9/2000 | Albert et al. |

(Continued)

FOREIGN PATENT DOCUMENTS

EP 1 099 207 B1 3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — Paul Huber
(74) *Attorney, Agent, or Firm* — David J. Cole

(57) ABSTRACT

A data structure for use in controlling a bistable electro-optic display having a plurality of pixels comprises a pixel data storage area storing, for each pixel of the display, data representing initial and desired final states of the pixel, and a drive scheme index number representing the drive scheme to be applied; and a drive scheme storage area storing data representing at least all the drive schemes denoted by the drive scheme index numbers stored in the pixel data storage area. A corresponding method of driving a bistable electro-optic display using such a data structure is also provided.

24 Claims, 2 Drawing Sheets

U.S. PATENT DOCUMENTS

| | | | | |
|---|---|---|---|---|
| 6,120,588 | A | 9/2000 | Jacobson | |
| 6,120,839 | A | 9/2000 | Comiskey et al. | |
| 6,124,851 | A | 9/2000 | Jacobson | |
| 6,128,124 | A | 10/2000 | Silverman | |
| 6,130,773 | A | 10/2000 | Jacobson et al. | |
| 6,130,774 | A | 10/2000 | Albert et al. | |
| 6,137,467 | A | 10/2000 | Sheridon et al. | |
| 6,144,361 | A | 11/2000 | Gordon, II et al. | |
| 6,147,791 | A | 11/2000 | Sheridon | |
| 6,172,798 | B1 | 1/2001 | Albert et al. | |
| 6,177,921 | B1 | 1/2001 | Comiskey et al. | |
| 6,184,856 | B1 | 2/2001 | Gordon, II et al. | |
| 6,225,971 | B1 | 5/2001 | Gordon, II et al. | |
| 6,232,950 | B1 | 5/2001 | Albert et al. | |
| 6,241,921 | B1 | 6/2001 | Jacobson et al. | |
| 6,249,271 | B1 | 6/2001 | Albert et al. | |
| 6,252,564 | B1 | 6/2001 | Albert et al. | |
| 6,262,706 | B1 | 7/2001 | Albert et al. | |
| 6,262,833 | B1 | 7/2001 | Loxley et al. | |
| 6,271,823 | B1 | 8/2001 | Gordon, II et al. | |
| 6,300,932 | B1 | 10/2001 | Albert | |
| 6,301,038 | B1 | 10/2001 | Fitzmaurice et al. | |
| 6,312,304 | B1 | 11/2001 | Duthaler et al. | |
| 6,312,971 | B1 | 11/2001 | Amundson et al. | |
| 6,323,989 | B1 | 11/2001 | Jacobson et al. | |
| 6,327,072 | B1 | 12/2001 | Comiskey et al. | |
| 6,376,828 | B1 | 4/2002 | Comiskey | |
| 6,377,387 | B1 | 4/2002 | Duthaler et al. | |
| 6,392,785 | B1 | 5/2002 | Albert et al. | |
| 6,392,786 | B1 | 5/2002 | Albert | |
| 6,413,790 | B1 | 7/2002 | Duthaler et al. | |
| 6,422,687 | B1 | 7/2002 | Jacobson | |
| 6,445,374 | B2 | 9/2002 | Albert et al. | |
| 6,445,489 | B1 | 9/2002 | Jacobson et al. | |
| 6,459,418 | B1 | 10/2002 | Comiskey et al. | |
| 6,473,072 | B1 | 10/2002 | Comiskey et al. | |
| 6,480,182 | B2 | 11/2002 | Turner et al. | |
| 6,498,114 | B1 | 12/2002 | Amundson et al. | |
| 6,504,524 | B1 | 1/2003 | Gates et al. | |
| 6,506,438 | B2 | 1/2003 | Duthaler et al. | |
| 6,512,354 | B2 | 1/2003 | Jacobson et al. | |
| 6,515,649 | B1 | 2/2003 | Albert et al. | |
| 6,518,949 | B2 | 2/2003 | Drzaic | |
| 6,521,489 | B2 | 2/2003 | Duthaler et al. | |
| 6,531,997 | B1 | 3/2003 | Gates et al. | |
| 6,535,197 | B1 | 3/2003 | Comiskey et al. | |
| 6,538,801 | B2 | 3/2003 | Jacobson et al. | |
| 6,545,291 | B1 | 4/2003 | Amundson et al. | |
| 6,580,545 | B2 | 6/2003 | Morrison et al. | |
| 6,639,578 | B1 | 10/2003 | Comiskey et al. | |
| 6,652,075 | B2 | 11/2003 | Jacobson | |
| 6,657,772 | B2 | 12/2003 | Loxley | |
| 6,664,944 | B1 | 12/2003 | Albert et al. | |
| D485,294 | S | 1/2004 | Albert | |
| 6,672,921 | B1 | 1/2004 | Liang et al. | |
| 6,680,725 | B1 | 1/2004 | Jacobson | |
| 6,683,333 | B2 | 1/2004 | Kazlas et al. | |
| 6,693,620 | B1 | 2/2004 | Herb et al. | |
| 6,704,133 | B2 | 3/2004 | Gates et al. | |
| 6,710,540 | B1 | 3/2004 | Albert et al. | |
| 6,721,083 | B2 | 4/2004 | Jacobson et al. | |
| 6,724,519 | B1 | 4/2004 | Comiskey et al. | |
| 6,727,881 | B1 | 4/2004 | Albert et al. | |
| 6,738,050 | B2 | 5/2004 | Comiskey et al. | |
| 6,750,473 | B2 | 6/2004 | Amundson et al. | |
| 6,753,999 | B2 | 6/2004 | Zehner et al. | |
| 6,788,449 | B2 | 9/2004 | Liang et al. | |
| 6,816,147 | B2 | 11/2004 | Albert | |
| 6,819,471 | B2 | 11/2004 | Amundson et al. | |
| 6,822,782 | B2 | 11/2004 | Honeyman et al. | |
| 6,825,068 | B2 | 11/2004 | Denis et al. | |
| 6,825,829 | B1 | 11/2004 | Albert et al. | |
| 6,825,970 | B2 | 11/2004 | Goenaga et al. | |
| 6,831,769 | B2 | 12/2004 | Holman et al. | |
| 6,839,158 | B2 | 1/2005 | Albert et al. | |
| 6,842,167 | B2 | 1/2005 | Albert et al. | |
| 6,842,279 | B2 | 1/2005 | Amundson | |
| 6,842,657 | B1 | 1/2005 | Drzaic et al. | |
| 6,864,875 | B2 | 3/2005 | Drzaic et al. | |
| 6,865,010 | B2 | 3/2005 | Duthaler et al. | |
| 6,866,760 | B2 | 3/2005 | Paolini, Jr. et al. | |
| 6,870,657 | B1 | 3/2005 | Fitzmaurice et al. | |
| 6,870,661 | B2 | 3/2005 | Pullen et al. | |
| 6,900,851 | B2 | 5/2005 | Morrison et al. | |
| 6,922,276 | B2 | 7/2005 | Zhang et al. | |
| 6,950,220 | B2 | 9/2005 | Abramson et al. | |
| 6,958,848 | B2 | 10/2005 | Cao et al. | |
| 6,967,640 | B2 | 11/2005 | Albert et al. | |
| 6,980,196 | B1 | 12/2005 | Turner et al. | |
| 6,982,178 | B2 | 1/2006 | LeCain et al. | |
| 6,987,603 | B2 | 1/2006 | Paolini, Jr. et al. | |
| 6,995,550 | B2 | 2/2006 | Jacobson et al. | |
| 7,002,728 | B2 | 2/2006 | Pullen et al. | |
| 7,012,600 | B2 * | 3/2006 | Zehner et al. | 345/214 |
| 7,012,735 | B2 | 3/2006 | Honeyman et al. | |
| 7,023,420 | B2 | 4/2006 | Comiskey et al. | |
| 7,030,412 | B1 | 4/2006 | Drzaic et al. | |
| 7,030,854 | B2 | 4/2006 | Baucom et al. | |
| 7,034,783 | B2 | 4/2006 | Gates et al. | |
| 7,038,655 | B2 | 5/2006 | Herb et al. | |
| 7,061,663 | B2 | 6/2006 | Cao et al. | |
| 7,071,913 | B2 | 7/2006 | Albert et al. | |
| 7,075,502 | B1 | 7/2006 | Drzaic et al. | |
| 7,075,703 | B2 | 7/2006 | O'Neil et al. | |
| 7,079,305 | B2 | 7/2006 | Paolini, Jr. et al. | |
| 7,106,296 | B1 | 9/2006 | Jacobson | |
| 7,109,968 | B2 | 9/2006 | Albert et al. | |
| 7,110,163 | B2 | 9/2006 | Webber et al. | |
| 7,110,164 | B2 | 9/2006 | Paolini, Jr. et al. | |
| 7,116,318 | B2 | 10/2006 | Amundson et al. | |
| 7,116,466 | B2 | 10/2006 | Whitesides et al. | |
| 7,119,759 | B2 | 10/2006 | Zehner et al. | |
| 7,119,772 | B2 * | 10/2006 | Amundson et al. | 345/87 |
| 7,148,128 | B2 | 12/2006 | Jacobson | |
| 7,167,155 | B1 | 1/2007 | Albert et al. | |
| 7,170,670 | B2 | 1/2007 | Webber | |
| 7,173,752 | B2 | 2/2007 | Doshi et al. | |
| 7,176,880 | B2 | 2/2007 | Amundson et al. | |
| 7,180,649 | B2 | 2/2007 | Morrison et al. | |
| 7,190,008 | B2 | 3/2007 | Amundson et al. | |
| 7,193,625 | B2 | 3/2007 | Danner et al. | |
| 7,202,847 | B2 | 4/2007 | Gates | |
| 7,202,991 | B2 | 4/2007 | Zhang et al. | |
| 7,206,119 | B2 | 4/2007 | Honeyman et al. | |
| 7,223,672 | B2 | 5/2007 | Kazlas et al. | |
| 7,230,750 | B2 | 6/2007 | Whitesides et al. | |
| 7,230,751 | B2 | 6/2007 | Whitesides et al. | |
| 7,236,290 | B1 | 6/2007 | Zhang et al. | |
| 7,236,291 | B2 | 6/2007 | Kaga et al. | |
| 7,236,292 | B2 | 6/2007 | LeCain et al. | |
| 7,242,513 | B2 | 7/2007 | Albert et al. | |
| 7,247,379 | B2 | 7/2007 | Pullen et al. | |
| 7,256,766 | B2 | 8/2007 | Albert et al. | |
| 7,259,744 | B2 | 8/2007 | Arango et al. | |
| 7,280,094 | B2 | 10/2007 | Albert | |
| 7,304,634 | B2 | 12/2007 | Albert et al. | |
| 7,304,787 | B2 | 12/2007 | Whitesides et al. | |
| 7,312,784 | B2 | 12/2007 | Baucom et al. | |
| 7,312,794 | B2 * | 12/2007 | Zehner et al. | 345/214 |
| 7,312,916 | B2 | 12/2007 | Pullen et al. | |
| 7,321,459 | B2 | 1/2008 | Masuda et al. | |
| 7,327,511 | B2 | 2/2008 | Whitesides et al. | |
| 7,339,715 | B2 | 3/2008 | Webber et al. | |
| 7,349,148 | B2 | 3/2008 | Doshi et al. | |
| 7,352,353 | B2 | 4/2008 | Albert et al. | |
| 7,365,394 | B2 | 4/2008 | Denis et al. | |
| 7,365,733 | B2 | 4/2008 | Duthaler et al. | |
| 7,375,875 | B2 | 5/2008 | Whitesides et al. | |
| 7,382,363 | B2 | 6/2008 | Albert et al. | |
| 7,388,572 | B2 | 6/2008 | Duthaler et al. | |
| 7,391,555 | B2 | 6/2008 | Albert et al. | |
| 7,411,719 | B2 | 8/2008 | Paolini, Jr. et al. | |
| 7,411,720 | B2 | 8/2008 | Honeyman et al. | |
| 7,420,549 | B2 | 9/2008 | Jacobson et al. | |
| 7,442,587 | B2 | 10/2008 | Amundson et al. | |
| 7,443,571 | B2 | 10/2008 | LeCain et al. | |
| 7,453,445 | B2 | 11/2008 | Amundson | |

| | | | | |
|---|---|---|---|---|
| 7,492,339 | B2 | 2/2009 | Amundson | |
| 7,492,497 | B2 | 2/2009 | Paolini, Jr. et al. | |
| 7,513,813 | B2 | 4/2009 | Paolini, Jr. et al. | |
| 7,528,822 | B2 | 5/2009 | Amundson et al. | |
| 7,532,388 | B2 | 5/2009 | Whitesides et al. | |
| 7,535,624 | B2 | 5/2009 | Amundson et al. | |
| 7,545,358 | B2 | 6/2009 | Gates et al. | |
| 7,551,346 | B2 | 6/2009 | Fazel et al. | |
| 7,554,712 | B2 | 6/2009 | Patry et al. | |
| 7,561,324 | B2 | 7/2009 | Duthaler et al. | |
| 7,583,251 | B2 | 9/2009 | Arango et al. | |
| 7,583,427 | B2 | 9/2009 | Danner et al. | |
| 7,598,173 | B2 | 10/2009 | Ritenour et al. | |
| 7,602,374 | B2 | 10/2009 | Zehner et al. | |
| 7,605,799 | B2 | 10/2009 | Amundson et al. | |
| 7,636,191 | B2 | 12/2009 | Duthaler | |
| 7,649,666 | B2 | 1/2010 | Isobe et al. | |
| 7,649,674 | B2 | 1/2010 | Danner et al. | |
| 7,667,684 | B2 | 2/2010 | Jacobson et al. | |
| 7,667,886 | B2 | 2/2010 | Danner et al. | |
| 7,672,040 | B2 | 3/2010 | Sohn et al. | |
| 7,679,599 | B2 | 3/2010 | Kawai | |
| 7,679,814 | B2 | 3/2010 | Paolini et al. | |
| 7,688,297 | B2 | 3/2010 | Zehner et al. | |
| 7,688,497 | B2 | 3/2010 | Danner et al. | |
| 7,705,824 | B2 | 4/2010 | Baucom et al. | |
| 7,728,811 | B2 | 6/2010 | Albert et al. | |
| 7,729,039 | B2 | 6/2010 | LeCain et al. | |
| 7,733,311 | B2 | 6/2010 | Amundson et al. | |
| 7,733,335 | B2 | 6/2010 | Zehner et al. | |
| 7,733,554 | B2 | 6/2010 | Danner et al. | |
| 7,746,544 | B2 | 6/2010 | Comiskey et al. | |
| 7,785,988 | B2 | 8/2010 | Amundson et al. | |
| 7,787,169 | B2 | 8/2010 | Abramson et al. | |
| 7,791,782 | B2 | 9/2010 | Paolini et al. | |
| 7,791,789 | B2 | 9/2010 | Albert et al. | |
| 7,800,580 | B2 | 9/2010 | Johnson et al. | |
| 7,826,129 | B2 | 11/2010 | Wu et al. | |
| 7,839,564 | B2 | 11/2010 | Whitesides et al. | |
| 7,843,621 | B2 | 11/2010 | Danner et al. | |
| 7,843,624 | B2 | 11/2010 | Danner et al. | |
| 7,843,626 | B2 | 11/2010 | Amundson et al. | |
| 7,848,006 | B2 | 12/2010 | Wilcox et al. | |
| 7,848,007 | B2 | 12/2010 | Paolini, Jr. et al. | |
| 7,859,637 | B2 | 12/2010 | Amundson et al. | |
| 7,893,435 | B2 | 2/2011 | Kazlas et al. | |
| 7,903,319 | B2 | 3/2011 | Honeyman et al. | |
| 7,910,175 | B2 | 3/2011 | Webber et al. | |
| 7,952,557 | B2 * | 5/2011 | Amundson et al. | 345/107 |
| 7,952,790 | B2 | 5/2011 | Honeyman et al. | |
| 7,956,841 | B2 | 6/2011 | Albert et al. | |
| 7,986,450 | B2 | 7/2011 | Cao et al. | |
| 7,999,787 | B2 | 8/2011 | Amundson et al. | |
| 8,009,348 | B2 | 8/2011 | Zehner et al. | |
| 8,018,640 | B2 | 9/2011 | Whitesides et al. | |
| 8,034,209 | B2 | 10/2011 | Danner et al. | |
| 8,035,886 | B2 | 10/2011 | Jacobson | |
| 8,054,526 | B2 | 11/2011 | Bouchard | |
| 8,064,962 | B2 | 11/2011 | Wilcox et al. | |
| 8,077,141 | B2 | 12/2011 | Duthaler et al. | |
| 8,089,453 | B2 | 1/2012 | Comiskey et al. | |
| 8,098,418 | B2 | 1/2012 | Paolini et al. | |
| 8,115,729 | B2 | 2/2012 | Danner et al. | |
| 8,125,501 | B2 | 2/2012 | Amundson et al. | |
| 8,129,655 | B2 | 3/2012 | Jacobson et al. | |
| 8,139,050 | B2 | 3/2012 | Jacobson et al. | |
| 2001/0050666 | A1 * | 12/2001 | Huang et al. | 345/88 |
| 2002/0060321 | A1 | 5/2002 | Kazlas et al. | |
| 2002/0090980 | A1 | 7/2002 | Wilcox et al. | |
| 2003/0102858 | A1 | 6/2003 | Jacobson et al. | |
| 2004/0105036 | A1 | 6/2004 | Danner et al. | |
| 2004/0119681 | A1 | 6/2004 | Albert et al. | |
| 2004/0263947 | A1 | 12/2004 | Drzaic et al. | |
| 2005/0001810 | A1 | 1/2005 | Yakushiji et al. | |
| 2005/0012980 | A1 | 1/2005 | Wilcox et al. | |
| 2005/0122284 | A1 | 6/2005 | Gates et al. | |
| 2005/0122306 | A1 | 6/2005 | Wilcox et al. | |
| 2005/0122563 | A1 | 6/2005 | Honeyman et al. | |
| 2005/0156340 | A1 | 7/2005 | Valianatos et al. | |
| 2005/0179642 | A1 * | 8/2005 | Wilcox et al. | 345/107 |
| 2005/0253777 | A1 | 11/2005 | Zehner et al. | |
| 2005/0259068 | A1 | 11/2005 | Nihei et al. | |
| 2005/0280626 | A1 * | 12/2005 | Amundson et al. | 345/107 |
| 2006/0087479 | A1 | 4/2006 | Sakurai et al. | |
| 2006/0087489 | A1 | 4/2006 | Sakurai et al. | |
| 2006/0087718 | A1 | 4/2006 | Takagi et al. | |
| 2006/0170648 | A1 * | 8/2006 | Zhou et al. | 345/107 |
| 2006/0181504 | A1 | 8/2006 | Kawai | |
| 2006/0209008 | A1 | 9/2006 | Nihei et al. | |
| 2006/0214906 | A1 | 9/2006 | Kobayashi et al. | |
| 2006/0231401 | A1 | 10/2006 | Sakurai et al. | |
| 2006/0232547 | A1 | 10/2006 | Johnson et al. | |
| 2006/0238488 | A1 | 10/2006 | Nihei et al. | |
| 2006/0263927 | A1 | 11/2006 | Sakurai et al. | |
| 2007/0013683 | A1 | 1/2007 | Zhou et al. | |
| 2007/0052757 | A1 | 3/2007 | Jacobson | |
| 2007/0091417 | A1 | 4/2007 | Cao et al. | |
| 2007/0091418 | A1 | 4/2007 | Danner et al. | |
| 2007/0097489 | A1 | 5/2007 | Doshi et al. | |
| 2007/0103427 | A1 | 5/2007 | Zhou et al. | |
| 2007/0211002 | A1 | 9/2007 | Zehner et al. | |
| 2007/0273637 | A1 | 11/2007 | Zhou et al. | |
| 2007/0285385 | A1 | 12/2007 | Albert et al. | |
| 2008/0024429 | A1 | 1/2008 | Zehner | |
| 2008/0024482 | A1 | 1/2008 | Gates et al. | |
| 2008/0043318 | A1 | 2/2008 | Whitesides et al. | |
| 2008/0048969 | A1 | 2/2008 | Whitesides et al. | |
| 2008/0048970 | A1 | 2/2008 | Drzaic et al. | |
| 2008/0054879 | A1 | 3/2008 | LeCain et al. | |
| 2008/0074730 | A1 | 3/2008 | Cao et al. | |
| 2008/0129667 | A1 * | 6/2008 | Zehner et al. | 345/87 |
| 2008/0130092 | A1 | 6/2008 | Whitesides et al. | |
| 2008/0136774 | A1 | 6/2008 | Harris et al. | |
| 2008/0150888 | A1 | 6/2008 | Albert et al. | |
| 2008/0218839 | A1 | 9/2008 | Paolini, Jr. et al. | |
| 2008/0266245 | A1 | 10/2008 | Wilcox et al. | |
| 2008/0273132 | A1 | 11/2008 | Hsu et al. | |
| 2008/0291129 | A1 | 11/2008 | Harris et al. | |
| 2008/0309350 | A1 | 12/2008 | Danner et al. | |
| 2009/0004442 | A1 | 1/2009 | Danner | |
| 2009/0009852 | A1 | 1/2009 | Honeyman et al. | |
| 2009/0034057 | A1 | 2/2009 | LeCain et al. | |
| 2009/0046082 | A1 | 2/2009 | Jacobson et al. | |
| 2009/0122389 | A1 | 5/2009 | Whitesides et al. | |
| 2009/0174651 | A1 | 7/2009 | Jacobson et al. | |
| 2009/0179923 | A1 | 7/2009 | Amundson et al. | |
| 2009/0237773 | A1 | 9/2009 | Cao et al. | |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |
| WO | WO 2006/064459 | 6/2006 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).
Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Bouchard, A. et al., "High-Resolution Microencapsulated Electrophoretic Display on Silicon", SID 04 Digest, 651 (2004).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic Ink for all-printed reflective electronic displays", Nature, 394, 253 (1998).
Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Gates, H. et al., "A5 Sized Electronic Paper Display for Document Viewing", SID 05 Digest, (2005).
Hayes, R.A., et al., "Video-Speed Electronic Paper Based on Electrowetting", Nature, vol. 425, Sep. 25, pp. 383-385 (2003).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", ID'W02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances, SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal TiO2 Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1378 (2002).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).
Zhou, G. et al., "Driving Schemes for Active Matrix Electrophoretic Displays", IDW Proceedings (2003).

* cited by examiner

METHODS FOR DRIVING ELECTRO-OPTIC DISPLAYS

REFERENCE TO RELATED APPLICATIONS

This application claims benefit of Application Ser. No. 61/044,067, filed Apr. 11, 2008.

This application is related to:

(a) U.S. Pat. No. 6,504,524;
(b) U.S. Pat. No. 6,512,354;
(c) U.S. Pat. No. 6,531,997;
(d) U.S. Pat. No. 6,995,550;
(e) U.S. Pat. Nos. 7,012,600 and 7,312,794, and the related Patent Publications Nos. 2006/0139310 and 2006/0139311;
(f) U.S. Pat. No. 7,034,783;
(g) U.S. Pat. No. 7,119,772;
(h) U.S. Pat. No. 7,193,625;
(i) U.S. Pat. No. 7,259,744;
(j) U.S. Patent Publication No. 2005/0024353;
(k) U.S. Patent Publication No. 2005/0179642;
(l) U.S. Pat. No. 7,492,339;
(m) U.S. Pat. No. 7,327,511;
(n) U.S. Patent Publication No. 2005/0152018;
(o) U.S. Patent Publication No. 2005/0280626;
(p) U.S. Patent Publication No. 2006/0038772;
(q) U.S. Pat. No. 7,453,445;
(r) U.S. Patent Publication No. 2008/0024482;
(s) U.S. Patent Publication No. 2008/0048969; and
(t) U.S. Patent Publication No. 2008/0129667.

The aforementioned patents and applications may hereinafter for convenience collectively be referred to as the "MEDEOD" (MEthods for Driving Electro-Optic Displays) applications. The entire contents of these patents and copending applications, and of all other U.S. patents and published and copending applications mentioned below, are herein incorporated by reference.

BACKGROUND OF INVENTION

The present invention relates to methods for driving electro-optic displays, especially bistable electro-optic displays, and to apparatus for use in such methods. More specifically, this invention relates to driving methods which are intended to enable a plurality of drive schemes to be used simultaneously to update an electro-optic display. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. No. 7,002,728 and U.S. Patent Application Publication No. 2007/0146310;

(b) Capsules, binders and encapsulation processes; see for example U.S. Pat. Nos. 6,922,276 and 7,411,719;

(c) Films and sub-assemblies containing electro-optic materials; see for example U.S. Pat. No. 6,982,178 and U.S. Patent Application Publication No. 2007/0109219;

(d) Backplanes, adhesive layers and other auxiliary layers and methods used in displays; see for example U.S. Pat. No. 7,116,318 and U.S. Patent Application Publication No. 2007/0035808;

(e) Color formation and color adjustment; see for example U.S. Pat. No. 7,075,502 and U.S. Patent Application Publication No. 2007/0109219;

(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; and 7,312,794; and U.S. Patent Applications Publication Nos. 2003/0102858; 2005/0024353; 2005/0062714; 2005/0122284; 2005/0152018; 2005/0179642; 2005/0212747; 2005/0253777; 2005/0280626; 2006/0038772; 2006/0139308; 2006/0139310; 2006/0139311; 2006/0181492; 2006/0181504; 2006/0197738; 2006/0232531; 2006/0262060; 2007/0013683; 2007/0091418; 2007/0103427; 2007/0200874; 2008/0024429; 2008/0024482; 2008/0048969; 2008/0054879; 2008/0117495; 2008/0129667; 2008/0136774; and 2008/0150888, and any other MEDEOD applications and patents mentioned above;

(g) Applications of displays; see for example U.S. Pat. No. 7,312,784 and U.S. Patent Application Publication No. 2006/0279527; and (h) Non-electrophoretic displays, as described in U.S. Pat. Nos. 6,241,921; 6,950,220; and 7,420,549.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^*=116(R/R_0)^{1/3}-16,$$

where R is the reflectance and $R_0$ is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display that the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

More specifically, present electrophoretic displays have an update time of approximately 1 second in grayscale mode, and 500 milliseconds in monochrome mode. In addition, many current display controllers can only make use of one updating scheme at any given time. As a result, the display is not responsive enough to react to rapid user input, such as keyboard input or scrolling of a select bar. This limits the applicability of the display for interactive applications. Accordingly, it is desirable to provide drive means and a corresponding driving method which provides a combination of drive schemes that allow a portion of the display to be updated with a rapid drive scheme, while the remainder of the display continues to be updated with a standard grayscale drive scheme.

One aspect of the present invention relates to data structures, methods and apparatus for driving electro-optic displays which permit rapid response to user input. The aforementioned MEDEOD applications describe several methods and controllers for driving electro-optic displays. Most of these methods and controllers make use of a memory having two image buffers, the first of which stores a first or initial image (present on the display at the beginning of a transition or rewriting of the display) and the second of which stores a final image, which it desired to place upon the display after the rewrite. The controller compares the initial and final images and, if they differ, applies to the various pixels of the display driving voltages which cause the pixels to undergo changes in optical state such that at the end of the rewrite (alternatively called an update) the final image is formed on the display.

However, in most of the aforementioned methods and controllers, the updating operation is "atomic" in the sense that once an update is started, the memory cannot accept any new image data until the update is complete. This causes difficulties when it is desired to use the display for applications that accept user input, for example via a keyboard or similar data input device, since the controller is not responsive to user input while an update is being effected. For electrophoretic media, in which the transition between the two extreme optical states may take several hundred milliseconds, this unresponsive period may vary from about 800 to about 1800 milliseconds, the majority of this period be attributable to the update cycle required by the electro-optic material. Although the duration of the unresponsive period may be reduced by removing some of the performance artefacts that increase update time, and by improving the speed of response of the electro-optic material, it is unlikely that such techniques alone will reduce the unresponsive period below about 500 milliseconds. This is still longer than is desirable for interactive applications, such example an electronic dictionary, where the user expects rapid response to user input. Accordingly, there is a need for an image updating method and controller with a reduced unresponsive period.

The aforementioned 2005/0280626 describes drive schemes which make use of the concept of asynchronous image updating (see the paper by Zhou et al., "Driving an Active Matrix Electrophoretic Display", Proceedings of the SID 2004) to reduce substantially the duration of the unresponsive period. The method described in this paper uses structures already developed for gray scale image displays to reduce the unresponsive period by up to 65 percent, as compared with prior art methods and controllers, with only modest increases in the complexity and memory requirements of the controller.

More specifically, the aforementioned 2005/0280626 describes two methods for updating an electro-optic display having a plurality of pixels, each of which is capable of achieving at least two different gray levels. The first method comprises:

(a) providing a final data buffer arranged to receive data defining a desired final state of each pixel of the display;

(b) providing an initial data buffer arranged to store data defining an initial state of each pixel of the display;

(c) providing a target data buffer arranged to store data defining a target state of each pixel of the display;

(d) determining when the data in the initial and final data buffers differ, and when such a difference is found updating the values in the target data buffer by (i) when the initial and final data buffers contain the same value for a specific pixel, setting the target data buffer to this value; (ii) when the initial data buffer contains a larger value for a specific pixel than the final data buffer, setting the target data buffer to the value of the initial data buffer plus an increment; and (iii) when the initial data buffer contains a smaller value for a specific pixel than the final data buffer, setting the target data buffer to the value of the initial data buffer minus said increment;

(e) updating the image on the display using the data in the initial data buffer and the target data buffer as the initial and final states of each pixel respectively;

(f) after step (e), copying the data from the target data buffer into the initial data buffer; and (g) repeating steps (d) to (f) until the initial and final data buffers contain the same data.

The second comprises:

(a) providing a final data buffer arranged to receive data defining a desired final state of each pixel of the display;

(b) providing an initial data buffer arranged to store data defining an initial state of each pixel of the display;

(c) providing a target data buffer arranged to store data defining a target state of each pixel of the display;

(d) providing a polarity bit array arranged to store a polarity bit for each pixel of the display;

(e) determining when the data in the initial and final data buffers differ, and when such a difference is found updating the values in the polarity bit array and target data buffer by (i) when the values for a specific pixel in the initial and final data buffers differ and the value in the initial data buffer represents an extreme optical state of the pixel, setting the polarity bit for the pixel to a value representing a transition towards the opposite extreme optical state; and (ii) when the values for a specific pixel in the initial and final data buffers differ, setting the target data buffer to the value of the initial data buffer plus or minus an increment, depending upon the relevant value in the polarity bit array;

(f) updating the image on the display using the data in the initial data buffer and the target data buffer as the initial and final states of each pixel respectively;

(g) after step (f), copying the data from the target data buffer into the initial data buffer; and (h) repeating steps (e) to (g) until the initial and final data buffers contain the same data.

None of the prior art described above provides a general solution to the problem of using multiple drive schemes simultaneously on a single display. In the aforementioned U.S. Pat. No. 7,119,772, only one of the two drive schemes is being applied at any one time; the monochrome or similar drive scheme is a “regional” drive scheme in the sense that it only updates the pixels which need to be changed, and thus only operates within the text box or similar selected area. If the part of the display outside the selected area needs to be changed, the display must switch back to the slower full gray scale drive scheme, so that rapid updating of the selected area is not possible which the non-selected area is being changed. Similarly, although the aforementioned 2005/0280626 provides a way of reducing the “latency” period before a new update can be started, only a single drive scheme is in use at any one time.

There is a need for a method of driving a bistable electro-optic display which permits a plurality of drive schemes to be used simultaneously. For example, in the text box/background image example used in the aforementioned U.S. Pat. No. 7,119,772, it might often be convenient for a user to scroll through a series of images displayed in the background while making notes with a keyboard or stylus in the text box area. Also, many electro-optic displays make use of so-called “menu bar operations” in which a series of radio buttons indicate which item on a menu is selected, and in such operations it is important that the radio button area be rapidly updated to that the user does not accidentally choose the wrong selection. It is also highly desirable that the method of driving a bistable electro-optic display permit the simultaneous use of multiple drive schemes having different update periods (for example, a monochrome drive scheme typically has a shorter update period than a gray scale drive scheme), and that each of the multiple drive schemes be permitted to start rewriting of its portion of the display independently of the other drive schemes; the usefulness of a rapid monochrome drive scheme is updating a menu bar is greatly diminished if a new update with the rapid monochrome drive scheme can only commence after completion of a much slower gray scale drive scheme update of a background area. The present invention provides a data structure, method of driving a bistable electro-optic display and an electro-optic display which meets these requirements.

SUMMARY OF INVENTION

Accordingly, this invention provides a data structure for use in controlling a bistable electro-optic display having a plurality of pixels, the data structure comprising:

a pixel data storage area arranged to store, for each pixel of the display, data representing an initial state of the pixel, data representing a desired final state of the pixel, and a drive scheme index number representing the drive scheme to be applied to the pixel; and a drive scheme storage area arranged to store data representing a plurality of drive schemes, the drive scheme storage area storing at least all the drive scheme denoted by the drive scheme index numbers stored in the pixel data storage area.

In a preferred form of this data structure, the drive scheme storage area also stores, for each drive scheme timing data representing the period since the commencement of the current update effected with the drive scheme.

This invention also provides a method of driving a bistable electro-optic display having a first plurality of pixels, the method comprising:

storing, for each pixel of the display, data representing an initial state of the pixel, data representing a desired final state of the pixel, and a drive scheme index number representing the drive scheme to be applied to the pixel;

storing data representing a plurality of drive schemes at least equal in number to the different drive scheme index numbers stored for the various pixels of the display; and generating, for at least a second plurality of pixels of the display, output signals representing the impulse to be applied to each of the second plurality of pixels, the output signals being generated, for each of the second plurality of pixels, dependent upon the initial and final states of the pixel, the drive scheme index number and the stored data representing the drive scheme denoted by the drive scheme index number.

In a preferred form of this method, there is also stored a time value for each of the stored drive schemes, and the generation of the output signals is also dependent upon the time value associated with the drive scheme denoted by the drive scheme index number.

This invention extends to a bistable electro-optic display having a plurality of pixels and comprising a data structure of the present invention, and to such a bistable electro-optic display arranged to carry out the method of the present invention.

The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

DETAILED DESCRIPTION

As indicated above, the present invention provides a data structure and method for operating a bistable electro-optic display. This data structure and method of operation allow for the simultaneous use of multiple drive schemes in the display. In preferred forms of the data structure and method of the present invention, the multiple drive schemes can begin at different times and thus run independently of each other.

The statement that the multiple drive schemes used in preferred forms of the present method can begin at different times does not imply that any given drive scheme can begin at any arbitrary time; commencement of the drive schemes is of course subject to certain limitations due to the manner in which the electro-optic display is driven. As discussed in the aforementioned MEDEOD applications, most high resolution displays use active matrix backplanes, with pixel electrodes arranged in a two-dimensional matrix defined by row electrodes and column electrodes. One row of pixel electrodes at a time is selected by a row driver, and appropriate voltages are placed on the column electrodes to provide the desired voltages on the electrodes in the selected row. After an appropriate interval, the previously-selected row is deselected and the next row is selected, so that the entire matrix of pixel electrodes is scanned in a row-by-row manner. The scanning of the entire matrix typically takes about 20 milliseconds.

Figure 1:
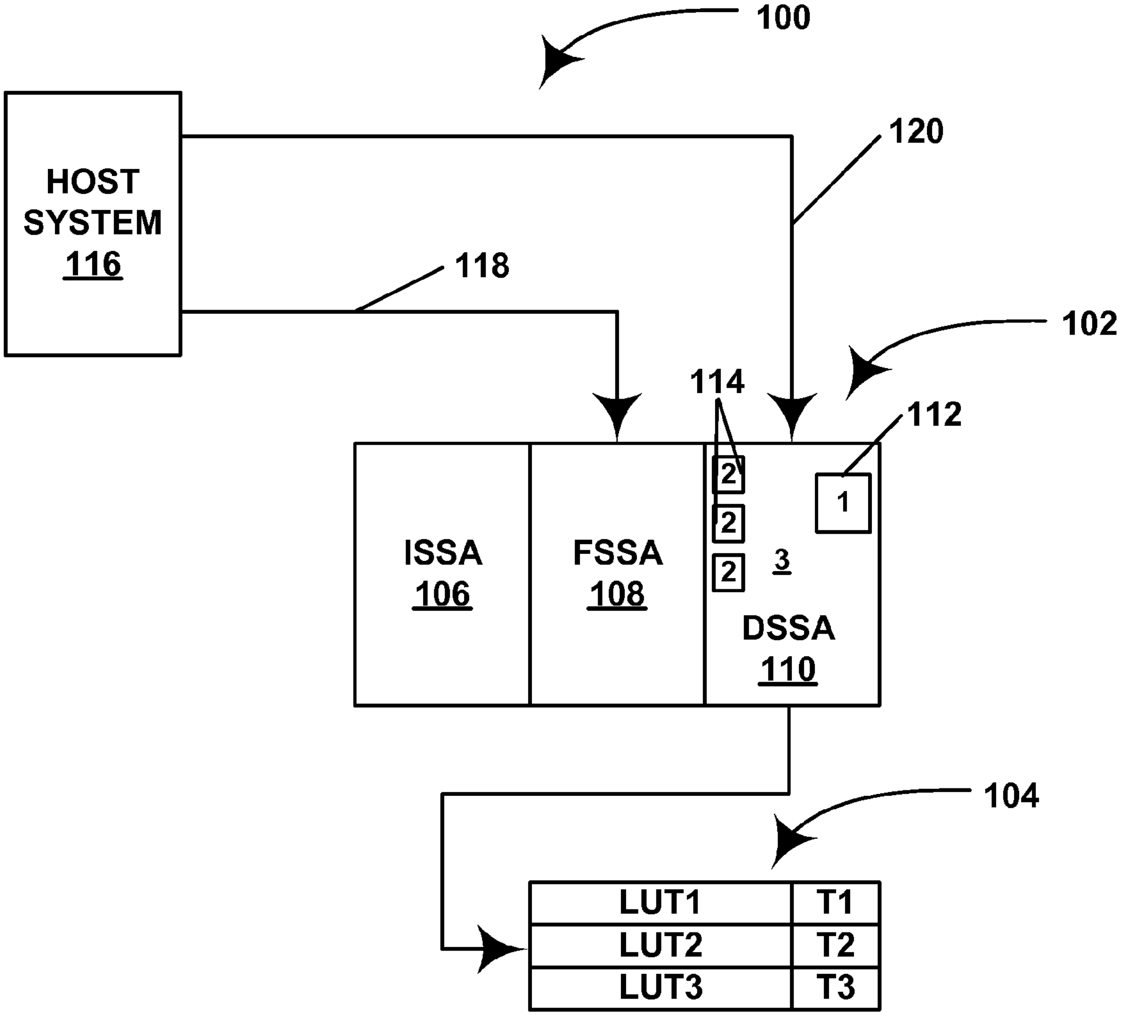
FIG. 1 of the accompanying drawings is a schematic illustration of a data structure of the present invention.

When choosing a drive scheme for such an active matrix display, to avoid undesirable image artifacts it is necessary to synchronize the drive scheme with the scanning of the display by dividing each waveform of the drive scheme into frames each of which represents an integral number (usually just one) of scans of the display, with the applied voltage for any pixel being kept constant within any one frame. In such active matrix displays, all drive schemes used must use the same frames, and a drive scheme can only begin at the beginning of a new frame, i.e., at a "frame boundary". Also, all waveforms used must occupy an integral number of frames, and all waveforms within a given drive scheme must occupy the same number of frames, but different drive schemes can occupy different numbers of frames. Note that no such limitations are present in so-called "direct drive" displays, in which each pixel is provided with a separate conductor so that the voltage on each pixel can be varied in an arbitrary manner, and there is no need for frames. When the present data structure and method are used in active matrix displays, it is convenient for the time value stored for each drive scheme to represent simply the number of frames which have elapsed since the commencement of the drive scheme, with this number being reduced to zero each time a rewriting of the relevant area of the display is completed. FIG. 1 of the accompanying drawings illustrates a data structure (generally designated 100) of the present invention. The data structure 100 comprises a pixel data storage area (generally designated 102) and a drive scheme storage area (generally designated 104). The pixel data storage area 102 is divided into an initial state storage area 106, a final state storage area 108 and a drive scheme selector area 110. Each of the three areas 106, 108 and 110 is arranged to store one integer for each pixel of the display. The initial data storage area 106 stores the initial gray level of each pixel, and the final state storage area 108 stores the desired final gray level of each pixel. The drive scheme selector area 110 stores, for each pixel, an integer which indicates which of a plurality of possible drive schemes is being used for the relevant pixel. As shown in FIG. 1, the drive scheme selector area 110 is storing a value "1" for all pixels within a single rectangle 112, a value "2" for each pixel within each of three small rectangles 114 (intended to act as radio buttons) and a value "3" for all other pixels.

It will be apparent to those skilled in computer technology that, although the areas 106, 108 and 110 are schematically illustrated in FIG. 1 as occupying discrete areas of memory, in practice this may not be the most convenient arrangement. For example, it may be more convenient for the data relating to each pixel to be gathered together as a single long "word". If, for example, each pixel is associated with a four-bit word in area 106, a four-bit word in area 108, and a four-bit word in area 110, it may be most convenient to store the data as a series of twelve-bit words, one for each pixel, with the first four bits defining the initial gray level, the middle four bits defining the final gray level, and the last four bits defining the drive scheme. It will also be apparent to skilled workers that the areas 106, 108 and 110 need not be the same size; for example, if the display is a 64 gray level (six-bit) display which can only make use of four simultaneous drive schemes, areas 106 and 108 would store six bits for each pixel but area 110 would only need to store two bits for each pixel.

Furthermore, although the area 110 is illustrated in FIG. 1 as storing a drive scheme selector value for each pixel of the display, this is not strictly necessary. The present invention can be modified so that each stored value in the area 110 could determine the drive scheme to be applied to a group of adjacent pixels (for example, a 2×2 or 3×3 grouping of pixels). In effect, the choice of drive scheme could be made on the basis of a "super-pixel" larger than the pixels on which gray level is controlled. However, this approach is not recommended since the amount of storage space needed for area 110 is not typically a major problem, and the ability to control the drive scheme used on a per pixel basis is useful in that it allows the various areas using differing drive schemes to have completely arbitrary shapes. For example, when the display with (say) VGA resolution (640×480) is being used to display a menu system, with individual menu items being selected by clicking radio buttons, the ability to control the drive scheme used on a per pixel basis allows one, instead of using simple rectangular areas as radio buttons, to use radio buttons of the type conventionally used in personal computer programs, with each button displaying a permanent annulus and the selected button displaying a solid black circle within its annulus.

The data in areas 108 and 110 are written directly by a host computer 116 via data lines 118 and 120 respectively. The manner in which data is written into area 106 is described in detail below.

The drive scheme storage area 104 shown in FIG. 1 comprises a series of rows, each row comprising a lookup table (denoted LUT1, LUT2, etc.) and a timing integer (denoted T1, T2, etc.). The timing integer represents the number of frames which have elapsed since the start of the relevant drive scheme. It will be appreciated that the various lookup tables may be of different sizes; for example, if the display is a 16 gray level (4-bit) display, a full gray scale lookup table requires 256 entries (16 initial states times 16 final states) whereas a lookup table for a monochrome area of the display requires only 4 entries.

Figure 2:
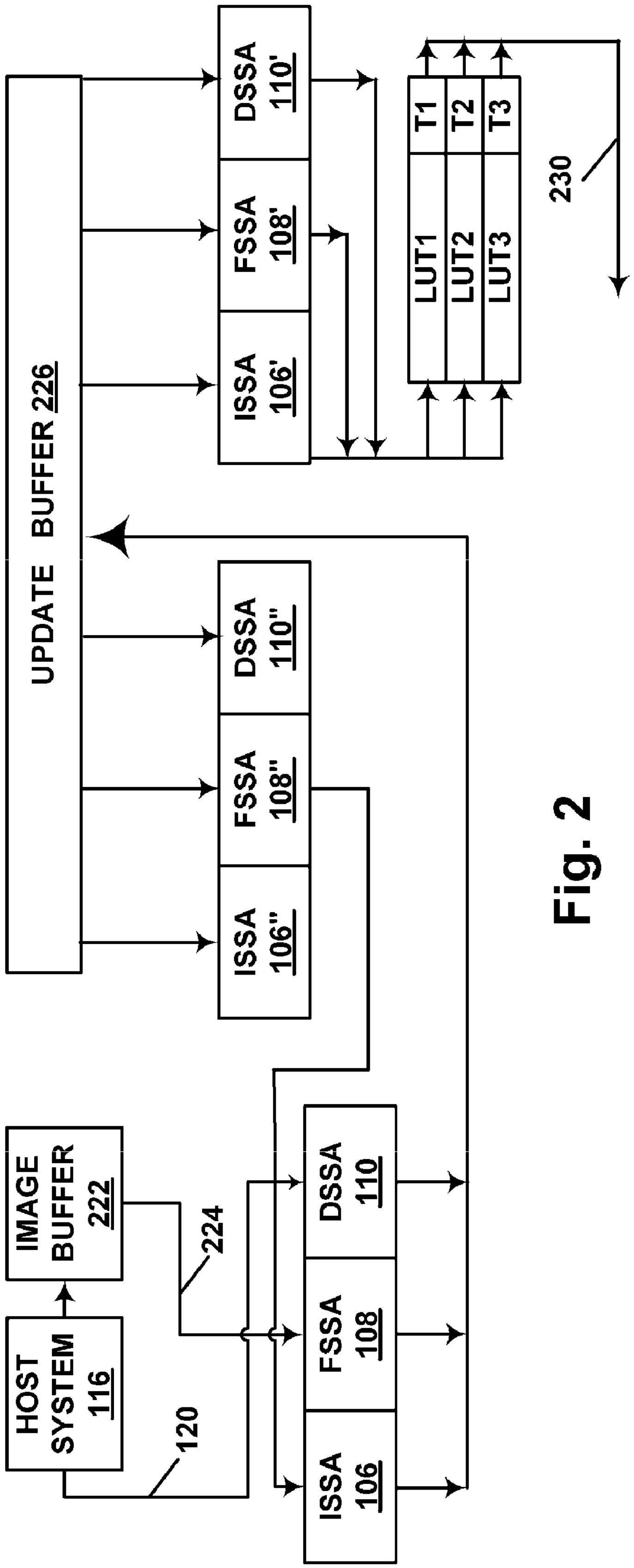
FIG. 2 is a schematic illustration of the mode of operation of an electro-optic display making use of the data structure of FIG. 1.

As indicated above, FIG. 1 is highly schematic, and FIG. 2 provides a somewhat more realistic, but still schematic view of how a bistable electro-optic display is driven in practice. As in FIG. 1, the system shown in FIG. 2 is controlled by a host computer 116, which feeds drive scheme selection data via a data line 120 to a drive scheme selector area 110. However, in the system shown in FIG. 2, the host computer 116 feeds image data, representing a new image to be displayed on the display, via a data line 118 to an image buffer 222. From this image buffer, the image data is copied asynchronously via a data line 224 to the final state storage area 108.

The data present in areas 106, 108 and 110 is copied asynchronously to an update buffer 226, whence the data is copied to two shadow data storage areas denoted 106', 108', 110' and 106", 108", 110" respectively. At appropriate intervals, data is copied from storage area 108" into storage area 106, thus providing the initial gray level data referred to above.

The shadow data storage areas 106', 108', 110' are used for the calculation of the output signals in the method of the present invention. As described in the aforementioned MEDEOD applications, a lookup table essentially comprises a two dimensional matrix, with one axis of the matrix representing the initial state of the pixel and the other axis representing the desired final state of the pixel. Each entry in the lookup table defines the waveform needed to effect the transition from the initial state to the final state, and typically comprises a series of integers representing the voltages to be applied to the pixel electrode during a series of frames. The display controller (not shown explicitly in FIG. 2) reads the drive scheme selector number from area 110' for each successive pixel, determines the relevant lookup table, and then reads the relevant entry from the selected lookup table using the initial and final state data from areas 106' and 108' respectively. The display controller also compares its internal clock (not shown) with the time integer associated with the selected lookup table to determine which of the integers in the selected lookup table entry relates to the current frame, and outputs the relevant integer on an output signal line 230.

The selection of the various areas to which the various different drive schemes are to be applied is controlled by the host system 116. Such selection of the various areas may be predetermined or controlled by an operator. For example, if a database program provides a dialog box for text input, the dimensions and placement of the dialog box will typically be predetermined by the database program. Similarly, in an E-book reader menu system, the locations of radio buttons, text etc. will be predetermined. On the other hand, the display might be used as an output device for an image editing program, and such programs typically allow the user to select ("lasso") an arbitrarily shaped area for manipulation.

It will be apparent that numerous variations of the data structures and methods of the present invention are possible. Such data structures and methods may include any of the optional features of the drive schemes set out in the aforementioned MEDEOD applications. For example, various MEDEOD applications describe the use of multiple lookup tables to allow for the sensitivity of electro-optic media to factors such as gray levels prior to the initial state, temperature, humidity, and operating lifetime of the electro-optic medium. Such multiple lookup tables can also be used in the present invention. It will be appreciated that providing multiple sets of lookup tables to allow for adjustments for several different environmental parameters, and for the multiple drive schemes used in the present invention, may result in the need to store a very large amount of data. In systems having limited amounts of RAM, it may be desirable to store the lookup tables in non-volatile storage (for example, on a hard disk or in ROM chips) and only move the specific lookup tables needed at any given time to ROM.

From the foregoing, it will be seen that the present invention can provide an improved user experience by making image update operations appear faster, because of the ability the invention provides to effect overlapping partial update operation of different image areas. The present invention also allows for electrophoretic and other electro-optic displays to be used in applications which require last user interface operations, such as mouse or stylus tracking, or menu bar operations.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A data structure for use in controlling a bistable electro-optic display having a plurality of pixels, the data structure comprising:

a pixel data storage area arranged to store, for each pixel of the display, data representing an initial state of the pixel, data representing a desired final state of the pixel, and a drive scheme index number representing the drive scheme to be applied to the pixel; and a drive scheme storage area arranged to store data representing a plurality of drive schemes, the drive scheme storage area storing at least all the drive schemes denoted by the drive scheme index numbers stored in the pixel data storage area.

2. A data structure according to claim 1 wherein drive scheme storage area also stores, for each drive scheme timing data representing the period since the commencement of the current update effected with the drive scheme.

3. A bistable electro-optic display having a plurality of pixels and comprising a data structure according to claim 1.

4. A bistable electro-optic display having a plurality of pixels and comprising a data structure according to claim 2.

5. A bistable electro-optic display according to claim 4 which is of the active matrix type wherein the pixels are arranged in a two-dimensional matrix defined by row electrodes and column electrodes, with one row of pixel electrodes at a time selected by a row driver, and appropriate voltages placed on the column electrodes to provide the desired voltages on the electrodes in the selected row, and after an appropriate interval, the previously selected row is deselected and the next row is selected so that the entire matrix of pixel electrodes is scanned in a row-by-row manner during a frame interval, and wherein the drive scheme timing data are arranged so that each drive begins at the beginning of a frame.

6. A display according to claim 5 wherein the time value stored for each drive scheme represents the number of frames which have elapsed since the commencement of the drive scheme.

7. A display according to claim 3 wherein the electro-optic material comprises a rotating bichromal member or electrochromic material.

8. A display according to claim 3 wherein the electro-optic material comprises an electrophoretic material comprising a plurality of electrically charged particles disposed in a fluid and capable of moving through the fluid under the influence of an electric field.

9. A display according to claim 8 wherein the electrically charged particles and the fluid are confined within a plurality of capsules or microcells.

10. A electro-optic display according to claim 8 wherein the electrically charged particles and the fluid are present as a plurality of discrete droplets surrounded by a continuous phase comprising a polymeric material.

11. A display according to claim 8 wherein the fluid is gaseous.

12. An electronic book reader, portable computer, tablet computer, cellular telephone, smart card, sign, watch, shelf label or flash drive incorporating a display according to claim 3.

13. A method of driving a bistable electro-optic display having a first plurality of pixels, the method comprising:

storing, for each pixel of the display, data representing an initial state of the pixel, data representing a desired final state of the pixel, and a drive scheme index number representing the drive scheme to be applied to the pixel;

storing data representing a plurality of drive schemes at least equal in number to the different drive scheme index numbers stored for the various pixels of the display; and generating, for at least a second plurality of pixels of the display, output signals representing the impulse to be applied to each of the second plurality of pixels, the output signals being generated, for each of the second plurality of pixels, dependent upon the initial and final states of the pixel, the drive scheme index number and the stored data representing the drive scheme denoted by the drive scheme index number.

14. A method according to claim 13 further comprising storing a time value for each of the stored drive schemes, and wherein the generation of the output signals is also dependent upon the time value associated with the drive scheme denoted by the drive scheme index number.

15. A bistable electro-optic display having a plurality of pixels and arranged to carry out the method of claim 13.

16. A bistable electro-optic display having a plurality of pixels and arranged to carry out the method of claim 14.

17. A bistable electro-optic display according to claim 16 which is of the active matrix type wherein the pixels are arranged in a two-dimensional matrix defined by row electrodes and column electrodes, with one row of pixel electrodes at a time selected by a row driver, and appropriate voltages placed on the column electrodes to provide the desired voltages on the electrodes in the selected row, and after an appropriate interval, the previously selected row is deselected and the next row is selected so that the entire matrix of pixel electrodes is scanned in a row-by-row manner during a frame interval, and wherein the drive scheme timing data are arranged so that each drive begins at the beginning of a frame.

18. A display according to claim 17 wherein the time value stored for each drive scheme represents the number of frames which have elapsed since the commencement of the drive scheme.

19. An electronic book reader, portable computer, tablet computer, cellular telephone, smart card, sign, watch, shelf label or flash drive incorporating a display according to claim 15.

20. A display according to claim 15 wherein the electro-optic material comprises a rotating bichromal member or electrochromic material.

21. A display according to claim 15 wherein the electro-optic material comprises an electrophoretic material comprising a plurality of electrically charged particles disposed in a fluid and capable of moving through the fluid under the influence of an electric field.

22. A display according to claim 21 wherein the electrically charged particles and the fluid are confined within a plurality of capsules or microcells.

23. A electro-optic display according to claim 21 wherein the electrically charged particles and the fluid are present as a plurality of discrete droplets surrounded by a continuous phase comprising a polymeric material.

24. A display according to claim 21 wherein the fluid is gaseous.

* * * * *